(12) United States Patent
Challener et al.

(10) Patent No.: US 7,421,588 B2
(45) Date of Patent: Sep. 2, 2008

(54) APPARATUS, SYSTEM, AND METHOD FOR SEALING A DATA REPOSITORY TO A TRUSTED COMPUTING PLATFORM

(75) Inventors: David Carroll Challener, Raleigh, NC (US); Joseph Wayne Freeman, Raleigh, NC (US); Steven Dale Goodman, Raleigh, NC (US); Randall Scott Springfield, Chapel Hill, NC (US)

(73) Assignee: Lenovo Pte Ltd, Singapore (SG)

( * ) Notice: Subject to any disclaimer, the term of this patent is extended or adjusted under 35 U.S.C. 154(b) by 848 days.

(21) Appl. No.: 10/749,057

(22) Filed: Dec. 30, 2003

(65) Prior Publication Data

US 2005/0141717 A1 Jun. 30, 2005

(51) Int. Cl.
*G06F 12/14* (2006.01)
(52) U.S. Cl. .................................................. 713/193
(58) Field of Classification Search .................. 713/193
See application file for complete search history.

(56) References Cited

U.S. PATENT DOCUMENTS

| | | | |
|---|---|---|---|
| 5,944,821 A | 8/1999 | Angelo | 713/200 |
| 6,988,250 B1 * | 1/2006 | Proudler et al. | 716/1 |
| 7,058,807 B2 * | 6/2006 | Grawrock et al. | 713/172 |
| 7,103,771 B2 * | 9/2006 | Grawrock | 713/155 |
| 7,216,369 B2 * | 5/2007 | Wiseman et al. | 726/34 |
| 2002/0166072 A1 | 11/2002 | Cromer et al. | 713/202 |
| 2003/0074548 A1 | 4/2003 | Cromer et al. | 713/1 |
| 2003/0110372 A1 * | 6/2003 | Proudler | 713/150 |
| 2003/0163711 A1 * | 8/2003 | Grawrock | 713/189 |
| 2004/0117625 A1 * | 6/2004 | Grawrock | 713/168 |
| 2005/0021968 A1 * | 1/2005 | Zimmer et al. | 713/176 |

OTHER PUBLICATIONS

Main Specification Version 1.1a, Trusted Computing Group (TCG), Sep. 2001, pp. 151-158.

* cited by examiner

*Primary Examiner*—Matthew Heneghan
(74) *Attorney, Agent, or Firm*—Kunzler & McKenzie

(57) ABSTRACT

An apparatus, method, and system to seal a data repository to a trusted computing platform is described. The data repository may be sealed by encrypting the data on the repository and sealing a cryptographic key to a specific set of platform resources. With the data repository sealed to the platform, the system boot sequence will fail if the system configuration is compromised, for example by insertion of "snoopware" or a modified BIOS. Additionally, if the computer containing the data repository is lost or stolen, the encrypted data remains secure even if the repository is attached to a system modified to bypass normal safeguards.

28 Claims, 8 Drawing Sheets

APPARATUS, SYSTEM, AND METHOD FOR SEALING A DATA REPOSITORY TO A TRUSTED COMPUTING PLATFORM

BACKGROUND OF THE INVENTION

1. Field of the Invention

This invention relates to computer security and more particularly relates to providing a trusted and secure computing platform.

2. Description of the Related Art

With the advent of personal computer system use in every day business transactions, the issue of computer security has become critical. Unsecured personal computers inhibit electronic business (e-business) because users are reluctant to transmit highly personal and sensitive information to a system which may be vulnerable to intruders or viruses. While many personal computer (PC) manufacturers have made individual strides towards increasing security by adding "smart cards" or embedded security chips to their new models, the lack of a concerted effort by the PC industry to develop security technology could prevent the evolution of this technology in a consistent and compatible way between manufacturers.

Recognizing this potential risk and the adverse effects it could have on inhibiting electronic commerce, an open alliance between major PC manufacturers and developers was formed to develop and propose a standard that would adopt hardware and software technologies to strengthen security at the platform level. The open alliance, known as the Trusted Computing Group (TCG), has proposed a standard including new hardware, Basic Input Output System (BIOS) and operating system specifications so PC manufacturers can provide a more trusted and secure PC platform based on common industry standards, the details of which are provided in the TCG PC Specific Implementation Specification, Version 1.1 (Aug. 18, 2003) (http://www.trustedcomputinggroup.org), hereby incorporated by reference.

FIG. 1 is a block diagram illustrating a trusted platform in accordance with TCG standards. As is shown, the PC architecture includes a system 100, platform 120, motherboard or planar 130, and trusted building block (TBB) 140. The system 100 includes the platform 120 and all post-boot components 112, including an operating system 114, that comprise the entire entity that performs actions for, or acts on behalf of, a user. The platform 120 presents and receives information to and from the user. The platform 120 includes the motherboard 130 and peripherals 122 attached to motherboard 130.

The motherboard 130 is provided by the manufacturer and includes one or more CPUs 132 and all primary peripheral devices 134, i.e., devices that directly attach to and directly interact with the CPU 132. In addition, the motherboard 130 includes all BIOSes 136 and the TBB 140. The TBB 140 is the center of the trusted platform, and includes a Core Root of Trust for Measurement (CRTM) 142, a Trusted Platform Module (TPM) 144, and a trusted connection 146 of the CRTM 142 and TPM 144 to the motherboard 130.

According to the TCG specification, the CRTM 142 and the TPM 144 are the only trusted components on the motherboard 130, i.e., they are presumably secure and isolated from tampering by a third party vendor or software. Only the authorized platform manufacturer (or agent thereof) can update or modify code contained therein. The CRTM 142 is the executable component of the TBB 140 that gains control of the platform 120 upon a platform reset. Thus, for all types of platform resets, the CPU 132 always begins executing code with the CRTM's 142 platform initialization code. The trust in the platform is based on the CRTM 142, and trust in all measurements is based on its integrity.

The basic premise underlying the trusted platform is ensuring that untrusted devices or software have not been loaded onto the system. Trust is established during a pre-boot state that is initiated by a platform reset. The platform reset can either be a cold boot (power-on), a hardware reset, or a warm boot typically caused by a user keyboard input. Following a platform reset, the CPU 132 executes the CRTM's 142 platform initialization code. The chain of trust begins at the CRTM 142.

In this architecture, the BIOS includes a Boot Block 150 and a POST BIOS 136. The Boot Block 150 and the POST BIOS 136 are independent components and each can be updated independent of the other. The Boot Block 150 is located in the CRTM 142, while the POST BIOS 36 is located outside the TBB 140. Thus, while the manufacturer or a third party supplier may update, modify or maintain the POST BIOS 136, only the manufacturer can modify or update the Boot Block 150. In a variation of the architecture, the entire BIOS is a single entity located entirely within the CRTM 142.

As stated above, the CRTM 142 and TPM 144 are presumptively trusted. Thus, following a platform reset, code in the Boot Block 150 is executed, which measures the entity to which it will transfer control, in this case, the Post BIOS 136. "Measuring an entity" means hashing object code in the entity to produce a log of the code, which is then extended into a platform configuration register (PCR) 148 in the TPM 144. The TPM 144 includes a plurality of PCRs 148, a portion of which are designated to the pre-boot environment and referred to collectively as boot PCRs 148a.Each boot PCR 148a is dedicated to collecting specific information related to a particular stage of a boot sequence. For example one boot PCR 148a (PCR[0]) stores measurements from the CRTM 142, POST BIOS 136, and all firmware 138 physically bound to the motherboard 130.

Once the POST BIOS 136 has been measured, control is transferred to the POST BIOS 136, which then continues to boot the system by ensuring that hardware devices are functional. Once POST BIOS 136 gains control, it is responsible for measuring any entity to which it will transfer control. As the POST BIOS 136 progresses through the boot sequence, values in the boot PCRs 148a increment whenever an entity is measured.

Upon booting to the operating system (OS) 114, the operating system 114 verifies the trustworthiness of the platform 120 by comparing the values in the boot PCRs 148a with precalculated values known by the operating system 114. If the values match, the operating system 114 is assured of a secure boot and that the platform is trusted. If the values do not match, the operating system 114 is alerted of a possible breach, and the operating system 114 can take measures to reestablish trust.

In FIGS. 2A and 2B, a flowchart illustrating a conventional boot sequence 200 in accordance with the TCPA trust model is presented. The method 200 starts 205 when the platform 120 is reset in step 210, e.g., the computer is powered-up, encounters a hardware reset or encounters a soft reset. In step 212, all boot PCRs 148a are reset to zero. Before the code in the Boot Block 150 is executed, the code may be measured, i.e., hashed to produce a log, which is then extended to the appropriate boot PCR 148a,via step 214. Then, in step 216, the code in the Boot Block 150 is run, which passes control over to the POST BIOS 136. Nevertheless, before executing the code in the POST BIOS 136, that code is also hashed and extended to the boot PCR 148a in step 218. Then, in step 220, the code in the POST BIOS 136 is run.

Referring now to FIG. 2B, the method 200 continues at letter B. The POST BIOS 136 locates any bootable devices in step 222 by reading each bootable device and attempting to find a valid boot record. When a valid boot record is discovered, the POST BIOS 136 measures the device and extends the value to the boot PCR 148a in step 224. Thereafter, in step 226, the code in the device is run. If this code determines that the boot is not a bootable device in step 228, control is then returned to the POST BIOS 136 to continue the booting sequence, via step 230.

If the device is a bootable device (step 228), an operating system 114 is booted 231. As explained above, each component is measured, i.e., the code in each device is hashed and extended to the appropriate boot PCR 148a. Thus, the values in the boot PCRs 148 reflect the boot sequence from beginning to end. In step 232, the operating system compares the value in each boot PCR 148a to a precalculated value that reflects a trustworthy boot sequence. The precalculated value is typically calculated by the operating system 114, which is aware of all trusted components.

If the boot PCR 148 values are equal to the precalculated value (step 232), the boot is finished 236. If the boot PCR 148 values are not equal to the precalculated value (step 232), the operating system 114 will initiate security checks to restore trust (step 238). The operating system 114 may examine the boot method to determine whether a security breach has occurred, for instance, by launching a virus detection program.

The trusted platform, as presented, offers significantly enhanced security over a traditional architecture if the system remains intact. However, as users become more mobile, there is an increasing risk that data and identity information on user systems may be compromised due to physical theft or loss. Whether the mobile computer is stolen for the sensitive data stored therein or for the hardware value is often unclear from the circumstances of the theft itself, typically, however, the owner must assume that efforts will be made to compromise the data stored thereon. One technique used to extract data is to remove the disk drive or other non-volatile memory and install the data repository on another system, which is designed to bypass security, and access the data thereon.

Cryptography has been used to secure the data in a data repository to protect against such attacks. A cryptographic key is then necessary to access the data stored in the data repository. Some systems typically create a clear partition containing boot data and the operating system and an encrypted partition containing all other data, accompanied by a utility that requests the user to input a cryptographic key. This system is open to attack by the substitution of a rogue operating system or programs masquerading as operating system components in the unencrypted partition. Of particular concern is the introduction of a snooper program that may record the cryptographic key. Even if the entire data repository is encrypted, a snooper program may be introduced into a rogue BIOS that may "steal" the key before the operating system can detect that the platform is insecure.

A need exists for a method, apparatus, and system that seals cryptographic keys associated with a data repository to a trusted platform. The sealing of cryptographic keys to a platform configuration will ensure that the data can be accessed only by the system that encrypted the data. The encrypted data may include one or more individual files, one or more partitions, or the entire disk volume. Sealing the cryptographic key of an entire encrypted volume will increase the security of the system startup, since the system will not boot if the BIOS, embedded firmware, or configuration has been compromised. Beneficially, such a process, apparatus, and system would permit unencumbered access to data in the data repository while it is an integral part of the trusted platform, but would prevent data access if the data repository were removed from the trusted platform, or if the trusted platform were compromised. The present invention addresses such a need.

SUMMARY OF THE INVENTION

The present invention has been developed in response to the present state of the art, and in particular, in response to the problems and needs in the art that have not yet been fully solved by currently available computer security devices. Accordingly, the present invention has been developed to provide a method, apparatus, and system for sealing a data repository to a trusted computer platform that overcomes many or all of the above-discussed shortcomings in the art.

The apparatus for sealing a data repository to a trusted computer platform is provided with a logic unit containing a plurality of modules configured to functionally execute the necessary steps of sealing a data repository to a trusted computer platform. These modules in the described embodiments include a cryptography module, a measurement module, and a key management module.

The apparatus, in one embodiment, is configured to seal a cryptographic key associated with a data repository to a set of measurement values that represent a specific configuration of platform resources. Sealing is the encrypting of a quantum of data using measurement values representing platform resources as keys to produce a sealed key. In one embodiment, the cryptographic key is sealed to a "digital fingerprint" that represents the embedded firmware including a BIOS, a boot record, a drive serial number, and an object code image of decryption software. If the specific configuration of platform resources is not present, the cryptographic key can not be unsealed and therefore encrypted data on the data repository will not be decrypted. In one embodiment the apparatus is used in conjunction with a system boot-up sequence, preventing the system from booting the operating system if the platform configuration has been compromised.

The apparatus is further configured, in one embodiment, to store a sealed cryptographic key to a removable device such as a USB memory key or a PCMCIA card, or to a removable media such as a removable disk, compact disk (CD), and the like. Requiring the presence of a removable object further increases the security of the encrypted data, since the cryptographic key is not available on the data repository, and both a data repository and a removable object must be present to permit access to the data in the repository.

In a further embodiment, the apparatus may be configured to require confirmation of a password or biometric identification before a cryptographic key may be unsealed. Requiring a password or biometric identification confirmation ensures that an authorized user is present when the cryptographic key is unsealed, and may defeat data access where a system containing the data repository and the associated sealed cryptographic key is lost or stolen.

A system of the present invention is also presented for sealing a data repository to a trusted computer platform. The system may be embodied in a trusted computer platform as set forth by the TCG. In particular, the system, in one embodiment, includes a key management module, a cryptographic module, an embedded security system (ESS), and a removable device. In one embodiment, the ESS functionality of sealing and unsealing a cryptographic key is performed by a device such as a Trusted Computer Module (TPM). The key management module seals a cryptographic key associated with a data repository to the platform configuration to produce a sealed key and may store the sealed key on the removable device. To access data on the repository, the key management module retrieves the sealed key, unseals the sealed key to produce the cryptographic key, and transmits the cryptographic key to the cryptographic module, which decrypts the data on the repository.

A method of the present invention is also presented for sealing a data repository to a trusted computer platform. The method in the disclosed embodiments substantially includes the steps necessary to carry out the functions presented above with respect to the operation of the described apparatus and system. In one embodiment, the method includes sealing a cryptographic key to a platform configuration, encrypting data to the repository, unsealing the sealed key, and decrypting data from the depository using the cryptographic key. The process also may include storing the sealed key to a removable device or to removable storage media.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
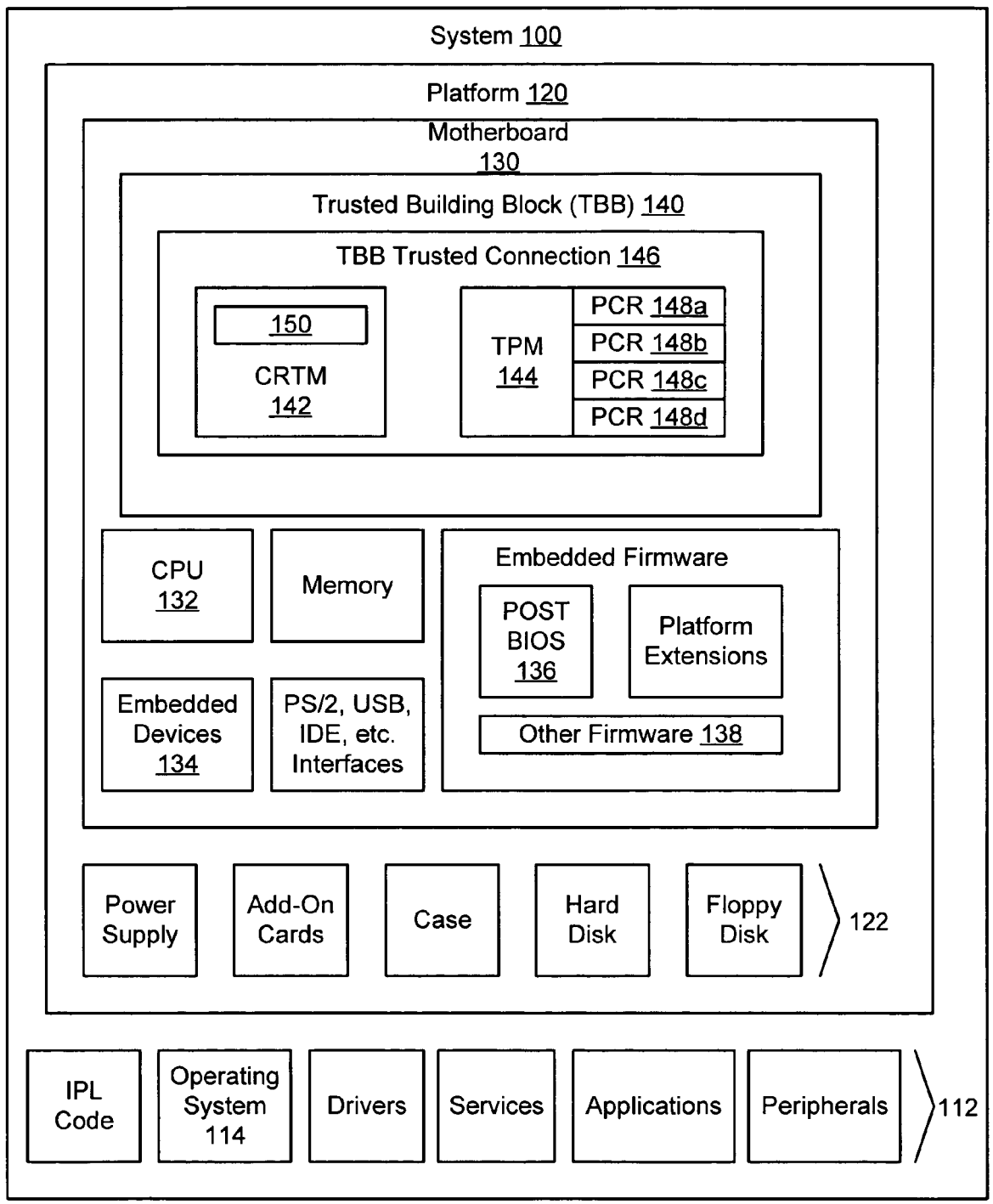
FIG. 1 is a schematic block diagram illustrating a conventional trusted computer system in accordance with a TCG trusted model.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software stored on a computer readable storage medium for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The present invention seals the data on a data repository, such as a hard disk, to a platform configuration by encrypting the data on the repository with a cryptographic key and then sealing the cryptographic key to the platform configuration. In order to unseal the sealed key, the platform must be in the same configuration that existed when the cryptographic key was sealed. The platform configuration may include the embedded firmware. Any modification to the embedded firmware, for example the insertion of "snooper code" into the BIOS, is detected and unsealing of the sealed key is not be permitted. Similarly, installing the data repository on a system specially designed to defeat normal computer security techniques would not provide access to the data, since the platform configuration would not be the same as when the cryptographic key was sealed.

Figure 3:
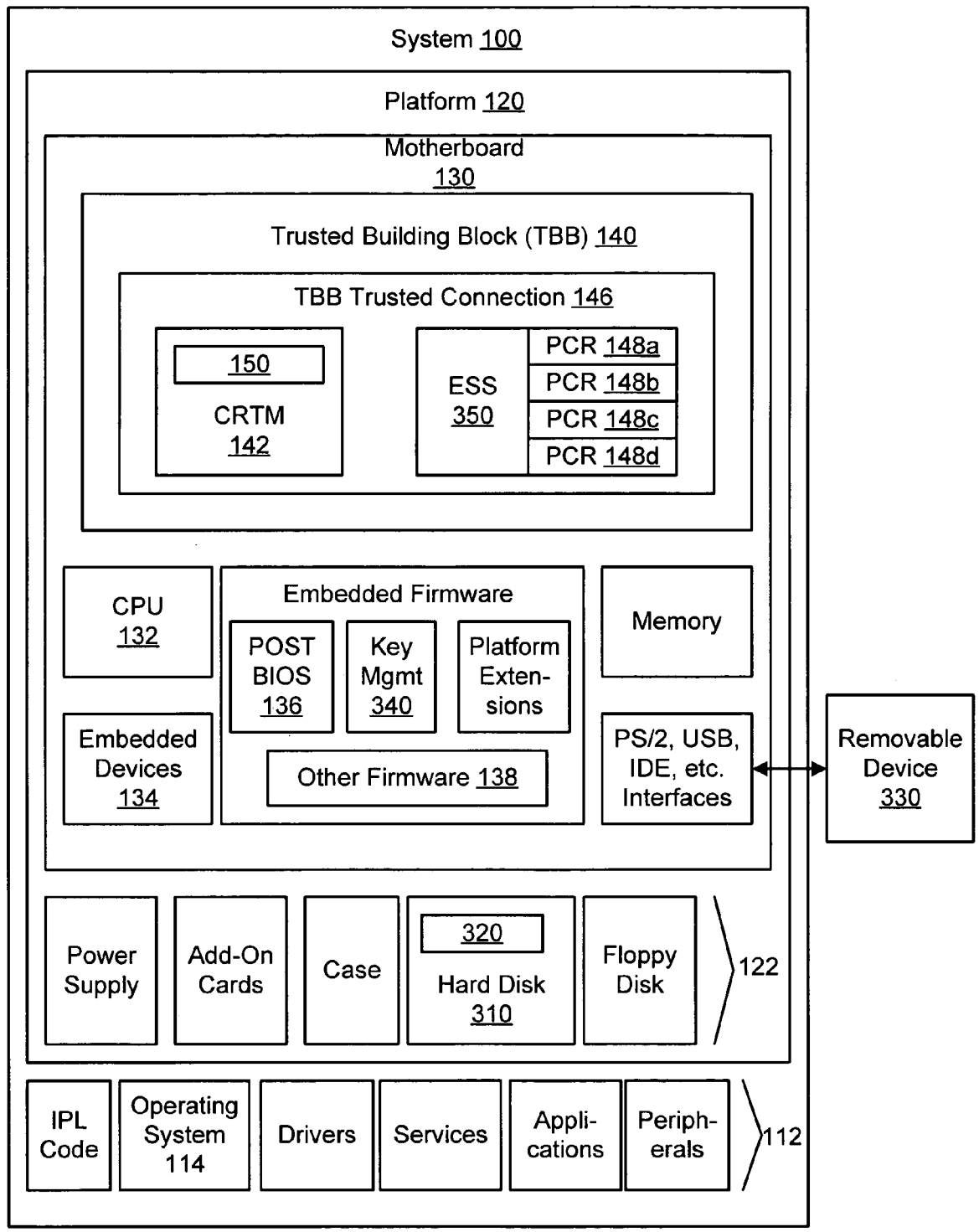
FIG. 3 is a schematic block diagram illustrating one embodiment of a system for sealing a data repository to a platform configuration in accordance with the present invention.

FIG. 3 is a schematic block diagram illustrating one embodiment of a system for sealing a data repository to a platform configuration in accordance with the present invention. The system architecture is similar to FIG. 1 and includes a system 100, platform 120, motherboard or planar 130, and trusted building block (TBB) 140. The platform 120 includes a hard disk 310 that may contain cryptographic data as encrypted by a cryptography module 320. The cryptography module 320 may be physically located on the hard disk 310 or on the motherboard 130. The cryptography module 320 also may decrypt encrypted data on the hard disk 310 for use by the system 100. In some embodiments, a sealed key may be stored on the hard disk 310. In other embodiments, the sealed key may be stored on a removable device 330 or on removable media. The motherboard 130 includes embedded firmware such as a power on self test (POST) BIOS 136, other trusted firmware 138, and a key management module 340. The key management module 340 performs the sealing and unsealing of cryptographic keys associated with the hard disk 310, and also writes and reads the sealed key to non-volatile storage such as a hard disk or removable storage media. The motherboard also includes the TBB 140. The TBB 140 includes a Core Root of Trust for Measurement (CRTM) 142, an embedded security system (ESS) 350, and a trusted connection 146 of the CRTM 142 and ESS 350 to the motherboard 130. A Trusted Platform Module (TPM) as set forth in the TCG PC Specific Implementation Specification is a representative example of an ESS 350.

Following a platform reset, code in the Boot Block 150 is executed, which measures the entity to which it will transfer control, in this case, the Post BIOS 136. "Measuring an entity" means combining, manipulating, and compressing digital data in the entity to produce a "digital fingerprint" that uniquely identifies the digital data, which may be loaded into or extended into a platform configuration register (PCR) 148 in the ESS 350. "Extending into a PCR" means cryptographically combining a measurement value with a previous PCR 148 value. For example, in one embodiment a measurement value is extended when the SHA-1 algorithm hashes a previous PCR 148 value concatenated with the measurement value to produce a new PCR 148 value.

The ESS 350 includes at least one PCR 148. In some embodiments, a number of PCRs 148 are designated to the pre-boot environment and referred to collectively as boot PCRs 148a. Each boot PCR 148a is dedicated to collecting specific information related to a particular stage of a boot sequence. For example, in one embodiment, one boot PCR 148a (PCR[0]) stores measurements from the CRTM 142, POST BIOS 136, key management module 139, and all firmware 138 physically bound to the motherboard 130.

In one embodiment, after verifying the functionality of hardware devices and determining a boot device, the POST BIOS 136 transfers control to the key management module 340. In one embodiment, the key management module 340 measures the serial number of the boot device and extends it to a PCR 148 and/or measures decryption object code within the cryptography module 320 and extends it to a PCR 148. In one embodiment, the key management module 340 also verifies a password or passphrase. Moreover, the key management module 340 reads the sealed key and uses the values in the PCRs to unseal the sealed key. The key management module 340 transfers the cryptographic key to the cryptography module 320. The POST BIOS 136 then boots the operating system (OS) 114.

If the various device measurement values used to seal the cryptographic key are not the same as when the cryptographic key was sealed, the unsealing fails and the system will not boot. For example, since the boot device serial number was included in the seal, the system will not boot if the boot device has been replaced. If the boot device has been relocated to a different system, the data will remain secure because the sealed key is sealed to the original platform configuration. Storage of the sealed key on a removable device such as a PCMCIA card or a USB memory key may make the system more secure.

Figure 4:
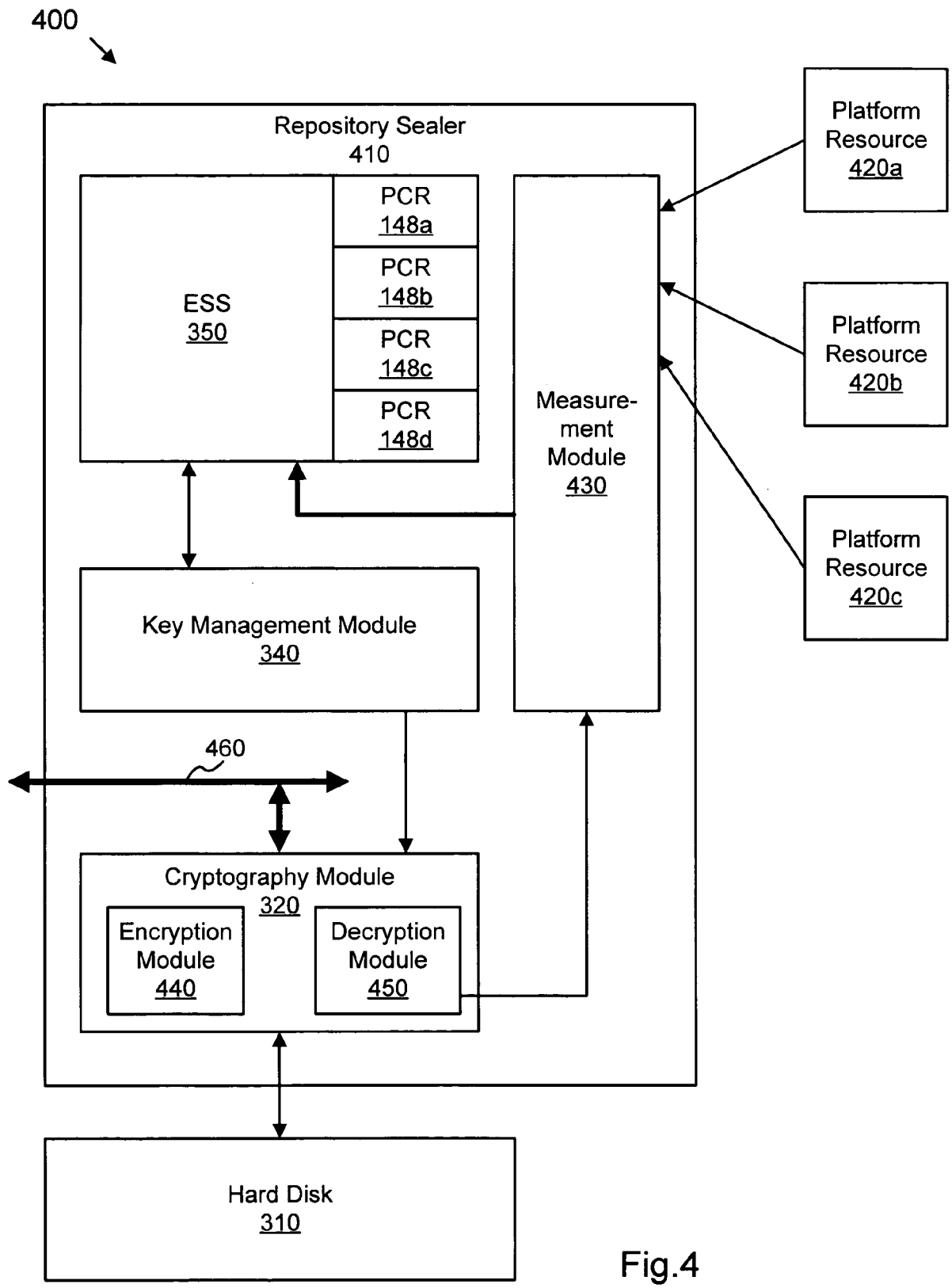
FIG. 4 is a schematic block diagram illustrating one embodiment of an apparatus for sealing a data repository to a platform configuration in accordance with the current invention.

FIG. 4 is a schematic block diagram illustrating one embodiment of an apparatus 400 for sealing a data repository such as a hard drive to a platform configuration in accordance with the present invention. The block diagram includes a repository sealer 410, a plurality of platform resources 420, and a hard disk 310. The repository sealer 410 includes an ESS 350 with at least one PCR 148, a measurement module 430, a key management module 340, a cryptography module 320 that includes an encryption module 440 and a decryption module 450, and a system bus 460.

The ESS 350 is a cryptographic module with storage locations in the form of platform configuration registers (PCRs) 148. A measurement value is extended into a PCR 148 by cryptographically combining a measurement value of a platform resource 420 and the previous value for the PCR 148. The ESS 350 may seal a quantum of digital data to the platform configuration by cryptographically combining the quantum of digital data with one or more PCR 148 values, in effect encrypting the quantum of digital data using the PCR values as keys. For example, a cryptographic key may be sealed to a PCR 148 value derived from a drive serial number using a Secure Hash Algorithm (SHA-1).

In like fashion, the ESS 350 may unseal a sealed quantum of digital data by cryptographically combining the sealed quantum of digital data with one or more PCR 148 values. For example, in one embodiment, a SHA-1 algorithm may generate a measurement value by hashing the data formed by the concatenated values of one or more PCR registers. The measurement value may be used as a key for decrypting the sealed key. If the PCR 148 value during unsealing matches the PCR value when the quantum of digital data was originally sealed, the quantum of digital data is unsealed. Referring to the example in the previous paragraph, the sealed key may be unsealed only if the value derived from the drive serial number is in the PCR at the time of unsealing. A Trusted Platform Module (TPM) as set forth in the TCG PC Specific Implementation Specification is one example of an ESS within the scope of the present invention.

The measurement module 430 measures one or more platform resources 420. "Measures" as used herein, means to combine, manipulate, and/or compress object code or other digital information for the platform resource 420 to produce a "digital fingerprint". For example, hashing might be used to produce a digital fingerprint of the decryption module 455 or POST BIOS 136. One embodiment uses a Secure Hash Algorithm (SHA-1) to measure platform resources 420.

The key management module 340 may cause the measurement module 430 to measure a platform resource 420 and extend the measurement value to a PCR 148. Additionally, the key management module 340 may cause the ESS 350 to seal and unseal a cryptographic key to certain PCR 148 values. Furthermore, the key management module 340 may transfer a cryptographic key to the cryptography module 320, and transfer a sealed key to/from the hard disk 310 or the removable device 330 (see FIG. 3).

The cryptography module 320 receives write data from the system bus 460, uses the encryption module 440 and a cryptographic key received from the key management module 340 to encrypt the write data, and writes the encrypted data to the hard disk 310. Additionally, the cryptography module 320 reads encrypted data from the hard disk 310, decrypts the data using the decryption module 450 and the cryptographic key, and sends data to the system bus 460. In embodiments, the cryptography module 320 is located on hard disk 310.

Figure 5:
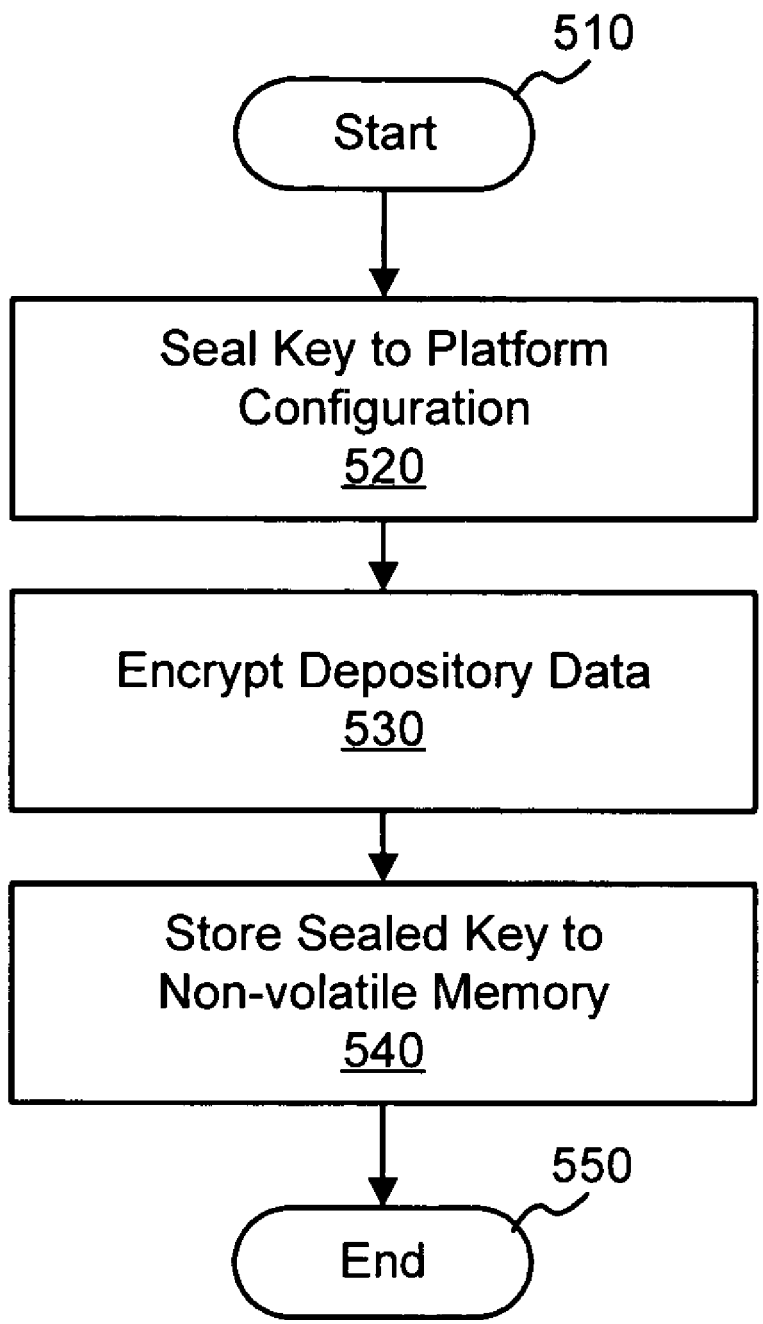
FIG. 5 is a schematic flow chart diagram illustrating one embodiment of a method for sealing a data repository to a platform configuration in accordance with the present invention.

FIG. 5 is a schematic flow chart illustrating one embodiment of a method 500 for sealing a data repository to a platform configuration in accordance with the present invention. The method 500 starts 510 when a decision is made to encrypt a data repository such as the hard disk 310 of FIG. 3. The method 500 first seals 520 a cryptographic key to one or more PCR 148 values representing a platform configuration using a repository sealer similar to the repository sealer 410 of FIG. 4, producing a sealed key. A platform configuration may include a wide variety of devices, components, and modules physically connected to the platform. For example, in one embodiment, the cryptographic key is sealed to PCR values representing a platform configuration including embedded firmware, embedded devices, a hard disk boot record, a hard disk serial number, and unencrypted data that resides on the hard disk 310.

Subsequently, the method 500 encrypts 530 the data in the data repository by reading a block of data, encrypting the data, and writing the data back to the repository, continuing until all data is encrypted. Then the method 500 stores 540 the sealed key to non-volatile memory. In one embodiment, the sealed key is stored on a removable device 330 such as a USB memory key or a PCMCIA card. In another embodiment, the sealed key is stored on a removable media such as a floppy disk, CD ROM, DVD ROM, or the like. In another embodiment, the sealed key is stored on an unencrypted partition of the hard drive 310. The method 500 then ends 550.

Figure 6:
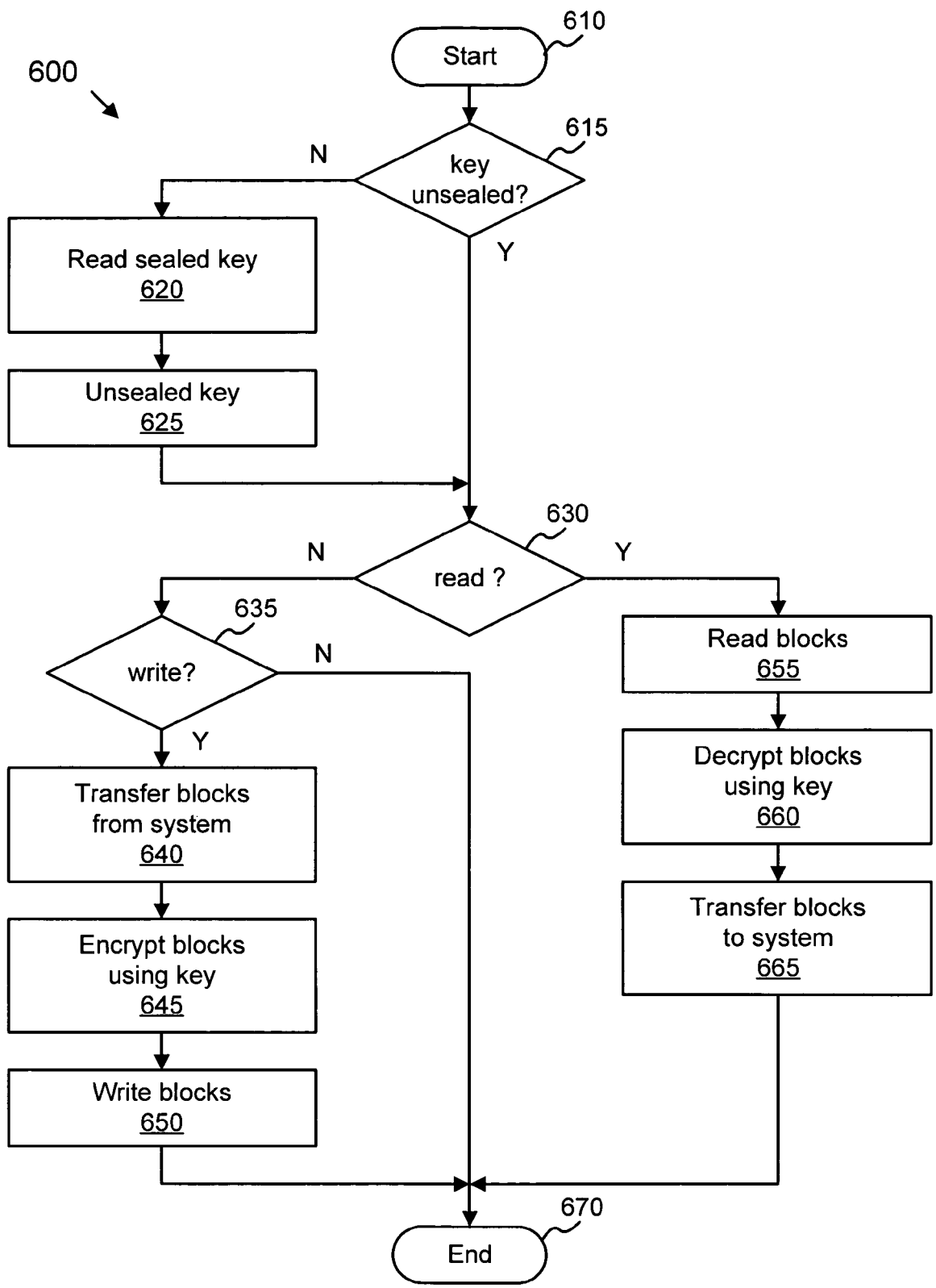
FIG. 6 is a schematic flow chart diagram illustrating one embodiment of a method for reading and writing data to a sealed data repository in accordance with the present invention.

FIG. 6 is a schematic flow chart illustrating one embodiment of a method for reading and writing data to a sealed data repository in accordance with the present invention. The method 600 starts 610 when a command is sent to a cryptographic module similar to the cryptography module 320 of FIG. 3. The method 600 determines 615 if the cryptographic key associated with the data repository is unsealed. If the cryptographic key is unsealed, the method 600 proceeds to step 630. If the cryptographic key has not been unsealed, the method 600 reads 620 the sealed key from non-volatile storage. Then, the method 600 unseals 625 the key using a repository sealer similar to the repository sealer 410 of FIG. 4 and proceeds to step 630.

At step 630, the method 600 determines if the command sent to the cryptographic module is a read command. If a read command, the method 600 reads 655 blocks from the data repository and decrypts 660 the blocks using the cryptographic key. Then, the method 600 transfers 665 the decrypted blocks to the system bus and ends 670. If not a read command (step 630), the method 600 determines 635 if the command sent to the cryptographic module is a write command. If not a write command, the method 600 ends 670. If a write command, the method 600 transfers 640 transfers blocks from the system bus and encrypts 645 the blocks using the cryptographic key. Then, the method 600 writes 650 the encrypted blocks to the data repository and ends 670.

Figure 2A:
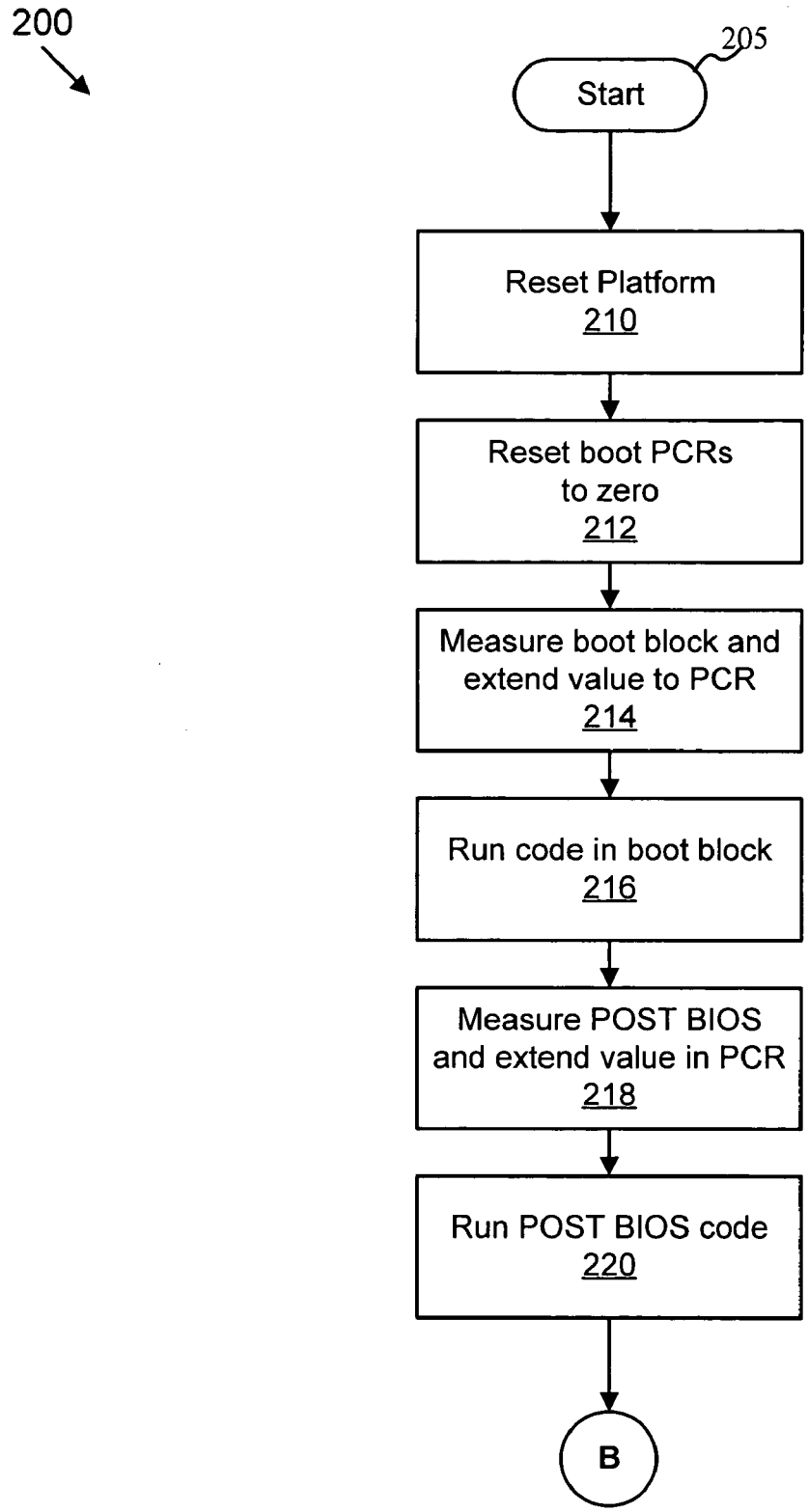
FIGS. 2A and 2B are schematic flow chart diagrams illustrating a conventional method for booting the trusted computer system in accordance with a TCG trusted model.
Figure 2B:
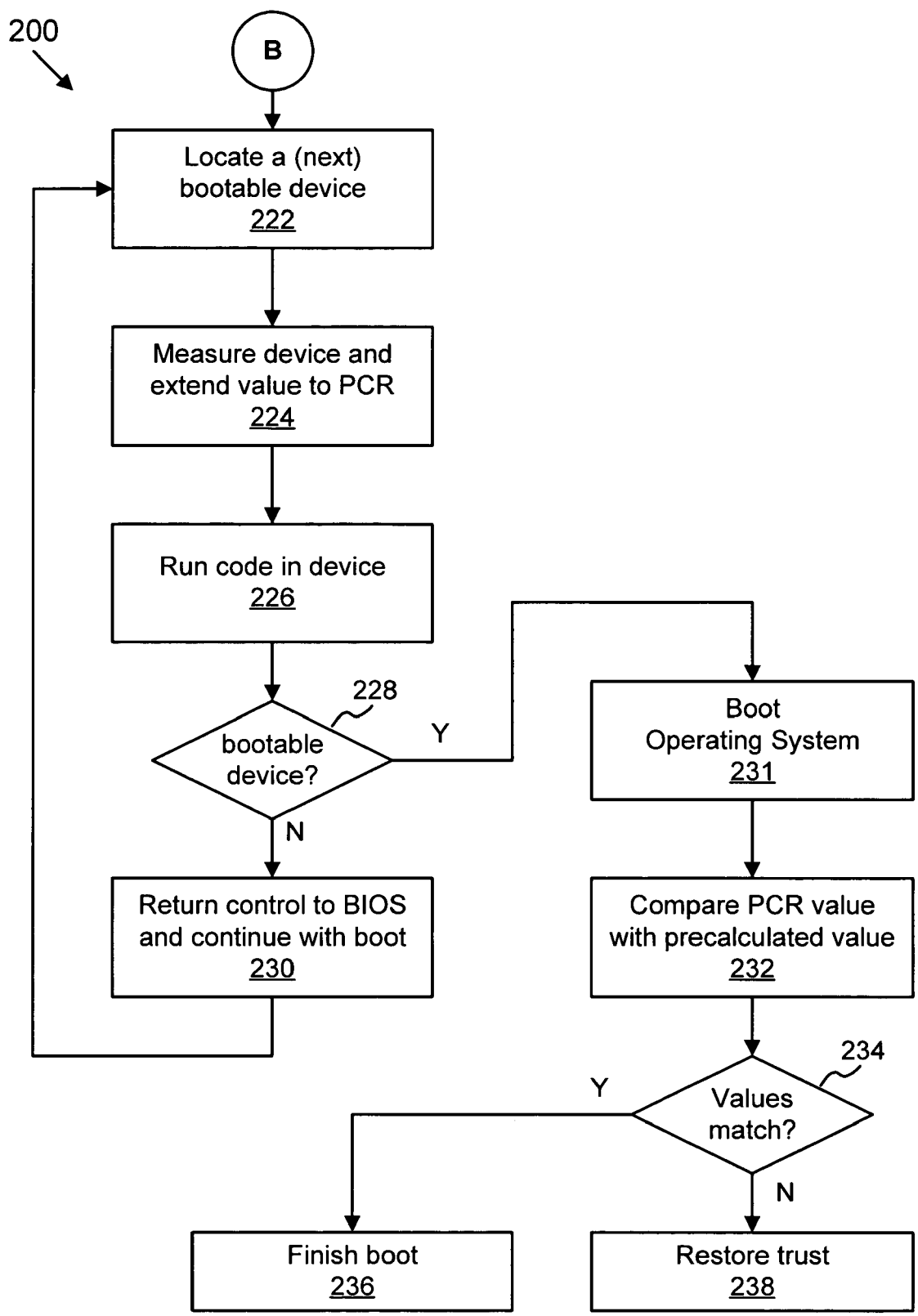
Figure 7:
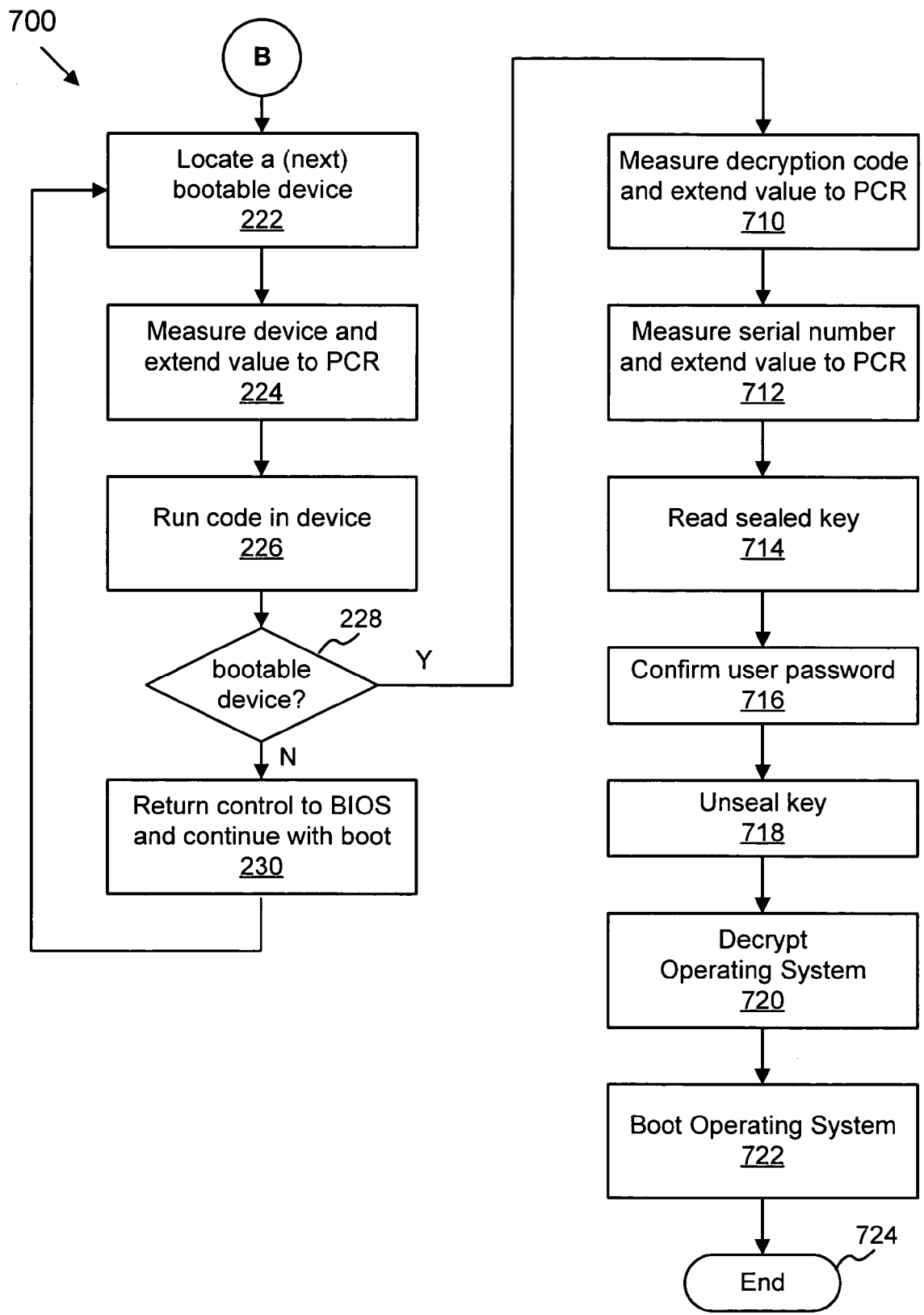
FIG. 7 is a schematic flow chart diagram illustrating one embodiment of a method for unsealing a data repository in accordance with the present invention.

FIG. 7 is a schematic flow chart illustrating one embodiment of a method 700 for unsealing a data repository in accordance with the present invention. The method 700 receives control from letter B of FIG. 2A during the system boot-up sequence. The POST BIOS 136 locates any bootable devices in step 222 by communicating with each bootable device and attempting to find a valid boot record. When a valid boot record is discovered, the POST BIOS 136 measures the device and extends the value to the boot PCR 148a in step 224. Thereafter, the code in the device is run 226. If this code determines 228 that the device is not a bootable device, control is then returned to the POST BIOS 136 to continue the booting sequence, via step 222.

If the device is a bootable device (step 228), in one embodiment the method 700 measures 710 the decryption module 450 object code and extends the value to an appropriate PCR 148. Subsequently the method 700 measures 712 the serial number of the hard drive 310 and extends the value to an appropriate PCR 148. The method 700 may extend to the same PCR 148 or a different PCR 148. Next, the method 700 reads 714 the sealed key. In some embodiments, the sealed key is read from a removable device 330.

Then, the method 700 confirms 716 a user password by querying a user and waiting for a response matching a predefined password. Subsequently, the method 700 unseals 718 the sealed key using a repository sealer similar to the repository sealer 410 of FIG. 4. As mentioned above, the sealed key is only unsealed if the platform configuration represented by the PCRs matches the platform configuration when the key was sealed. The method 700 then decrypts 720 object code storing the operating system 114 using the cryptographic key and a decryption module such as the decryption module 450 of FIG. 4. Then, the method 700 boots 722 the operating system 114 and ends 724.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for sealing a data repository to a trusted computing platform, the apparatus comprising:

an embedded security system (ESS) comprising at least one platform configuration register;

a measurement module configured to generate one or more measurement values for one or more devices physically connected to a computer system and to extend the measurement values to at least one platform configuration register;

a key management module configured to seal a cryptographic key associated with a data repository by cryptographically combining the cryptographic key with the measurement values for one or more of, a boot record, a drive serial number, and an object code image of decryption software in at least one platform configuration register, the measurement values representing a trusted configuration of the trusted computing platform, and to unseal the cryptographic key using the measurement values by way of the ESS; and a cryptography module configured to encrypt data stored in the data repository and to decrypt data read from the data repository with the unsealed cryptographic key.

2. The apparatus of claim 1, wherein the ESS is a Trusted Platform Module (TPM).

3. A system for sealing a data repository to a trusted computing platform, the system comprising:

a data repository configured to encrypt data written to the data repository and to decrypt data read from the data repository using a cryptographic key;

an embedded security system (ESS) comprising at least one platform configuration register;

a measuring module configured to generate one or more measurement values for one or more devices within the system and to extend the measurement values to one of the at least one platform configuration registers; and a key management module configured to:

seal the cryptographic key associated with the data repository by cryptographically combining the cryptographic key with the at least one platform configuration register measurement value for one or more of, a boot record, a drive serial number, and an object code image of decryption software, the measurement value representing a trusted configuration, and to unseal the cryptographic key using the measurement values by way of the ESS; and read a sealed cryptographic key, unseal the cryptographic key, and provide the cryptographic key to the data repository before an operating system loads.

4. The system of claim 3, wherein the ESS is a Trusted Platform Module (TPM).

5. The system of claim 3, wherein the key management module is further configured to write the sealed cryptographic key to a non-volatile data repository and to read the sealed cryptographic key from a non-volatile data repository.

6. The system of claim 5, wherein the non-volatile data repository is a repository selected from the group consisting of an unencrypted partition of a hard drive, a removable device, and a removable media.

7. A computer readable storage medium comprising computer readable code configured to carry out a method for sealing a data repository to a trusted computing platform, the method comprising:

encrypting data on a data repository with a cryptographic key;

sealing the cryptographic key by cryptographically combining the cryptographic key with measurement values for one or more of a boot record, a drive serial number, and an object code image of decryption software, the measurement values representing a trusted configuration to a platform configuration to produce a sealed key;

unsealing the sealed key using the measurement values to produce the cryptographic key; and decrypting data on the data repository with the unsealed cryptographic key.

8. The computer readable storage medium of claim 7, wherein sealing comprises generating a measurement value for a device comprising the platform configuration and generating the sealed key with the measurement value.

9. The computer readable storage medium of claim 8, wherein generating a measurement value comprises hashing a code image.

10. The computer readable storage medium of claim 7, wherein the sealed key is generated with a Trusted Platform Module (TPM).

11. The computer readable storage medium of claim 7, wherein unsealing comprises decrypting the sealed key with a measurement value for a device comprising the platform configuration, the measurement value matching a measurement value used to produce the sealed key.

12. The computer readable storage medium of claim 11, wherein a TPM unseals the sealed key.

13. The computer readable storage medium of claim 7, further comprising storing the sealed cryptographic key in a removable device.

14. The computer readable storage medium of claim 7, wherein the platform configuration comprises a serial number for the data repository.

15. The computer readable storage medium of claim 7, wherein the platform configuration comprises a decryption module.

16. The computer readable storage medium of claim 7, wherein the platform configuration comprises firmware and software accessible to a processor without the sealed key.

17. A method for sealing a data repository to a trusted computing platform, the method comprising:

encrypting data on a data repository with a cryptographic key;

sealing the cryptographic key by cryptographically combining the cryptographic key with measurement values for one or more of, a boot record, a drive serial number, and an object code image of decryption software, the measurement values representing a trusted configuration to a platform configuration to produce a sealed key;

unsealing the sealed key using the measurement values to produce the cryptographic key; and decrypting data on the data repository with the unsealed cryptographic key.

18. The method of claim 17, wherein sealing comprises generating a measurement value for a device comprising the platform configuration and generating the sealed key with the measurement value.

19. The method of claim 18, wherein generating a measurement value for a device comprises hashing firmware code for the device.

20. The method of claim 18, wherein the sealed key is generated with a Trusted Platform Module (TPM).

21. The method of claim 17, wherein unsealing comprises decrypting the sealed key with a measurement value for a device comprising the platform configuration, the measurement value matching a measurement value used to produce the sealed key.

22. The method of claim 17, wherein a TPM unseals the sealed key.

23. The method of claim 17, further comprising storing the sealed key in a removable device.

24. The method of claim 17, wherein the platform configuration comprises a serial number for the data repository.

25. The method of claim 17, wherein the platform configuration comprises a decryption module.

26. The method of claim 17, wherein the platform configuration comprises firmware and software accessible to a processor without the sealed key.

27. An apparatus comprising a logic unit for sealing a data repository to a trusted computing platform, the apparatus comprising:

means for generating a measurement value for a device among a plurality of devices comprising a platform configuration;

means for sealing a cryptographic key associated with a data repository to the measurement value for two or more of a BIOS, a boot record, a drive serial number, and an object code image of decryption software, the measurement value representing the devices to produce a sealed key;

means for unsealing the sealed key; and means for decrypting data on the data repository with the unsealed cryptographic key.

28. An apparatus for sealing a data repository to a trusted computing patform, the apparatus comprising:

an embedded security system (ESS) comprising at least one platform configuration register and configured to seal a cryptographic key to platform configuration data stored in the at least one platform configuration register to produce a sealed key and further configured to unseal the sealed key to produce an unsealed cryptographic key;

a key management module configured to direct the ESS to seal a cryptographic key associated with a data repository by cryptographiclly combining the cryptographic key with a measurement value for a drive serial number associated with the data repository, the measurement values representing a trusted configuration of the trusted computing platform, and further configured to a manage the sealed key, a measurement module configured to generate the measurement value for the data repository physically connected to the ESS, the ESS extending the measurement value to the at least one platform configuration register;

a cryptographic module configured ot encrypt data stored to the data repository and to decrypt data read from the data repository with the unsealed cryptographic key, and a removeable data repository configured to store the sealed key associated with the data repository.

* * * * *